(12) United States Patent
Heinzelmann et al.

(10) Patent No.: US 6,663,279 B1
(45) Date of Patent: Dec. 16, 2003

(54) DEVICE FOR MEASURING THE GEARBOX OIL TEMPERATURE

(75) Inventors: Karl-Fritz Heinzelmann, Meckenbeuren (DE); Harald Albrecht, Oberteuringen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/936,478

(22) PCT Filed: Mar. 31, 2000

(86) PCT No.: PCT/EP00/02866

§ 371 (c)(1),
(2), (4) Date: Sep. 13, 2001

(87) PCT Pub. No.: WO00/60325

PCT Pub. Date: Oct. 12, 2000

(30) Foreign Application Priority Data

Apr. 6, 1999 (DE) .......................... 199 15 471

(51) Int. Cl.[7] .......................... G01K 1/14; G01K 13/00
(52) U.S. Cl. .......................... 374/144; 374/142; 374/148
(58) Field of Search .......................... 374/142, 141, 374/148, 144; 475/117; 74/606 R

(56) References Cited

U.S. PATENT DOCUMENTS

| | | | | | |
|---|---|---|---|---|---|
| 1,454,149 | A | * | 5/1923 | Boyce | 374/144 |
| 1,781,512 | A | * | 11/1930 | Holt | 374/144 |
| 2,579,363 | A | * | 12/1951 | Cataldo | 374/144 |
| 4,622,851 | A | | 11/1986 | Wilson | 73/292 |
| 4,702,341 | A | * | 10/1987 | Taga et al. | 180/249 |
| 4,855,913 | A | * | 8/1989 | Brekkestran et al. | 701/66 |
| 5,003,842 | A | * | 4/1991 | Hatta et al. | 477/154 |
| 5,050,451 | A | * | 9/1991 | Hussain | 74/844 |
| 5,076,708 | A | * | 12/1991 | Pierson | 374/144 |
| 5,282,386 | A | * | 2/1994 | Niemczyk et al. | 374/142 |
| 5,315,825 | A | * | 5/1994 | Giberson | 60/336 |
| 5,421,791 | A | * | 6/1995 | Futuwatari | 475/117 |
| 5,449,329 | A | * | 9/1995 | Brandon et al. | 477/70 |
| 5,467,854 | A | * | 11/1995 | Creger et al. | 182/87.18 |
| 5,611,372 | A | * | 3/1997 | Bauer et al. | 74/606 R |
| 5,658,213 | A | * | 8/1997 | Sato et al. | 475/125 |
| 5,716,134 | A | * | 2/1998 | Wagner et al. | 374/141 |
| 5,730,094 | A | * | 3/1998 | Morris | 123/192.1 |
| 5,747,680 | A | * | 5/1998 | McArthur | 73/117.3 |
| 5,845,544 | A | * | 12/1998 | Huggins et al. | 74/606 R |
| 5,941,137 | A | * | 8/1999 | Beer et al. | 74/606 R |
| 5,947,856 | A | * | 9/1999 | Tabata et al. | 475/128 |
| 6,022,139 | A | * | 2/2000 | Kil | 374/142 |
| 6,106,151 | A | * | 8/2000 | Johannesson | 374/142 |
| 6,189,396 | B1 | * | 2/2001 | Barnreiter et al. | 74/335 |
| 6,199,663 | B1 | * | 3/2001 | Roy et al. | 184/55.1 |
| 6,216,528 | B1 | * | 4/2001 | Carrell et al. | 73/54.01 |
| 6,393,943 | B1 | * | 5/2002 | Sommer et al. | 74/606 R |
| 6,405,611 | B1 | * | 6/2002 | DeJonge et al. | 74/335 |
| 6,488,601 | B1 | * | 12/2002 | Sommer et al. | 474/70 |
| 6,530,856 | B1 | * | 3/2003 | Kakiage | 74/606 R |
| 2001/0004620 | A1 | * | 6/2001 | Onuki | 477/115 |
| 2002/0032093 | A1 | * | 3/2002 | Kopec et al. | 475/114 |

FOREIGN PATENT DOCUMENTS

| | | | | |
|---|---|---|---|---|
| DE | 31 08 242 A1 | | 11/1982 | G01M/13/02 |
| DE | 44 31 045 A1 | | 3/1996 | G01D/21/02 |
| DE | 296 11 668 U1 | | 10/1996 | G01K/17/00 |
| EP | 0278554 A2 | * | 8/1988 | G01D/3/10 |
| EP | 0 479 464 B1 | | 1/1997 | B60K/41/22 |
| JP | 08288498 | | 11/1996 | G01D/21/00 |
| SU | 1474293 A | * | 4/1989 | B60R/17/00 |

* cited by examiner

*Primary Examiner*—Diego Gutierrez
*Assistant Examiner*—Mirellys Jagan
(74) *Attorney, Agent, or Firm*—Davis & Bujold PLLC

(57) ABSTRACT

The invention relates to a device for measuring the temperature of an oil in a housing (4) of a transmission (2) with a temperature sensor (20) which can come into contact with the oil. The temperature sensor (20) is arranged outside the oil sump (16) in the transmission housing (4) and is preferably integrated directly in the transmission controller (18).

6 Claims, 2 Drawing Sheets

DEVICE FOR MEASURING THE GEARBOX OIL TEMPERATURE

FIELD OF THE INVENTION

The invention relates to a device for measuring the temperature of a transmission oil.

BACKGROUND OF THE INVENTION

In a vehicle transmission, for different reasons, it is required to measure the temperature of the lubricant used in the transmission and to supply different control devices. The temperature becomes necessary especially for diagnosis problems and for calculation of maintenance intervals. When a preset temperature threshold is exceeded, a warning is issued to the user of the vehicle.

Former systems have a measurement element directly mounted in the oil sump of the transmission. For example, a separate electronic system is needed for the evaluation of the signal. Further required is a not inconsiderable disbursement in cabling which is costly and exerts negative influences upon the reliability.

The problem on which the invention is based is to indicate a device for measuring the transmission oil temperature which offers an increased reliability at low cost.

The problem is solved by a device having the features of claim 1 or x (sic). Developments are object of sub-claims.

SUMMARY OF THE INVENTION

The invention proposes a device for measuring the temperature of the oil in a housing of a transmission having a temperature sensor which can come into contact with the oil in the transmission. The temperature sensor is here placed outside the oil sump in the transmission housing. In an advantageous development, the temperature sensor comes into contact with the oil during operation of the transmission by wetting with oil spray. To that end, in an advantageous development, the oil spray is whirled up by rotating elements in the transmission, the rotating elements being gear wheels of the transmission. In one other advantageous development, the temperature sensor is situated in the immediate proximity of a speed sensor with rotary meter disk so that the spray oil is sprayed on the temperature sensor by the meter disk.

Another advantageous development shows a temperature sensor which, during operation of the transmission, comes into contact with the oil via a lubricant circuit. In an advantageous development, the temperature sensor can be disposed in the pressure area of the lubricant circuit directly in parts of the transmission which contains the electronics and the shift actuation system.

One other advantageous development shows the temperature sensor integrated in another sensor, especially in a speed sensor.

In another advantageous development of the invention, the signals of a sensor of the transmission, which does not primarily serve for temperature detection, can be evaluated in an electronic control system for detection of the temperature. In an advantageous development of this, the inner resistance of a speed sensor can be detected and the change of temperature of the transmission oil can be evaluated in an electronic control system by the change of the inner resistance.

BRIEF DESCRIPTION OF THE DRAWINGS

The invention will now be described, by way of example, with reference to the accompanying drawings in which.

DETAILED DESCRIPTION OF THE INVENTION

Figure 1:
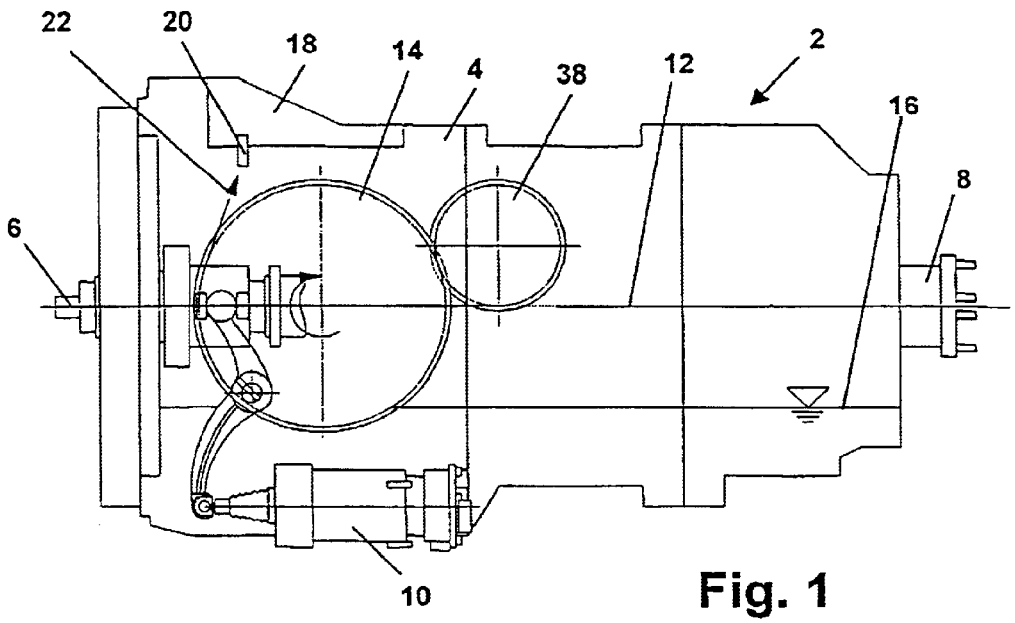
FIG. 1 is a transmission with oil spray wetting of the temperature sensor.

FIG. 1 shows a transmission 2 which has in a housing 4 one input shaft 6, one output shaft 8 and one clutch controller 10. Upon the input shaft 6 and a main shaft 12 of the transmission 2 a multiplicity of gear wheels is located. During its rotation in the operation of the transmission 2, the gear wheel 14 (shown here) propels around transmission oil from the sump 16 into the transmission housing 4. On the top side of the transmission housing 4 is provided a transmission controller 18 which is embedded in the transmission housing 4. The transmission controller 18 contains both the transmission electronics and the shifting actuation system. On the bottom side of the transmission controller 18, a temperature sensor 20 is located outside the oil sump 16. The oil propelled around by the gear wheel, diagrammatically shown by the arrow 22, impinges upon the temperature sensor 20 and comes into contact therewith. Thereby the temperature of the transmission oil can be evaluated in the transmission controller 18, for example. By the gear wheel 14 a meter disk 38 is also offset in rotation.

Figure 2:
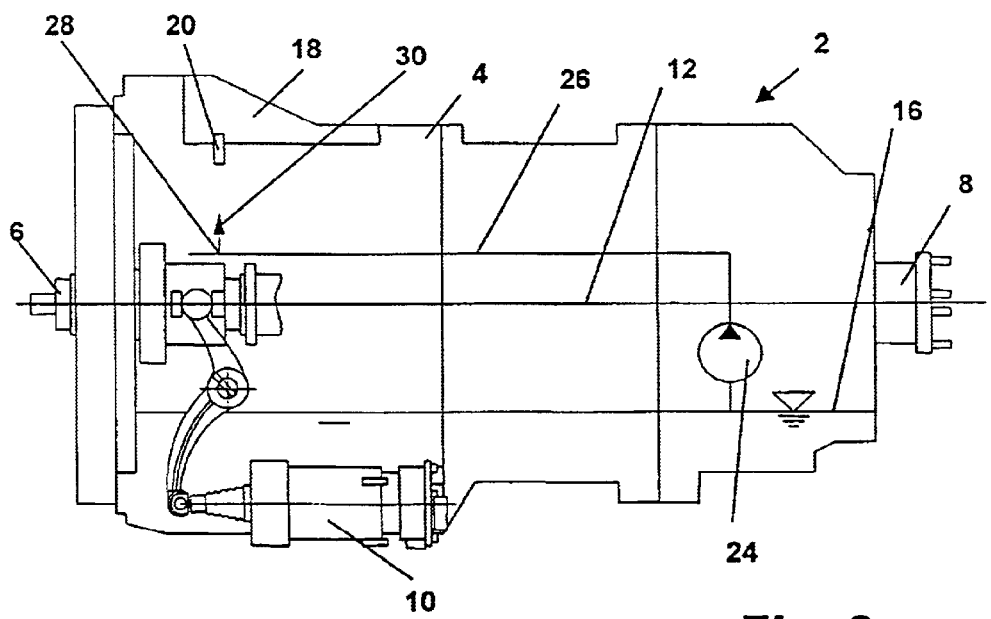
FIG. 2 is another transmission with oil spray wetting.

In FIG. 2, the same reference numerals have been used for the same components. The oil sump 16 is connected via a pump 24 with a pressurized oil line 26. On the pressurized oil line 26 of a lubricant circuit at least one opening 28 is provided from which oil spray is sprayed upon the temperature sensor 20, diagrammatically shown by the arrow 30.

Figure 3:
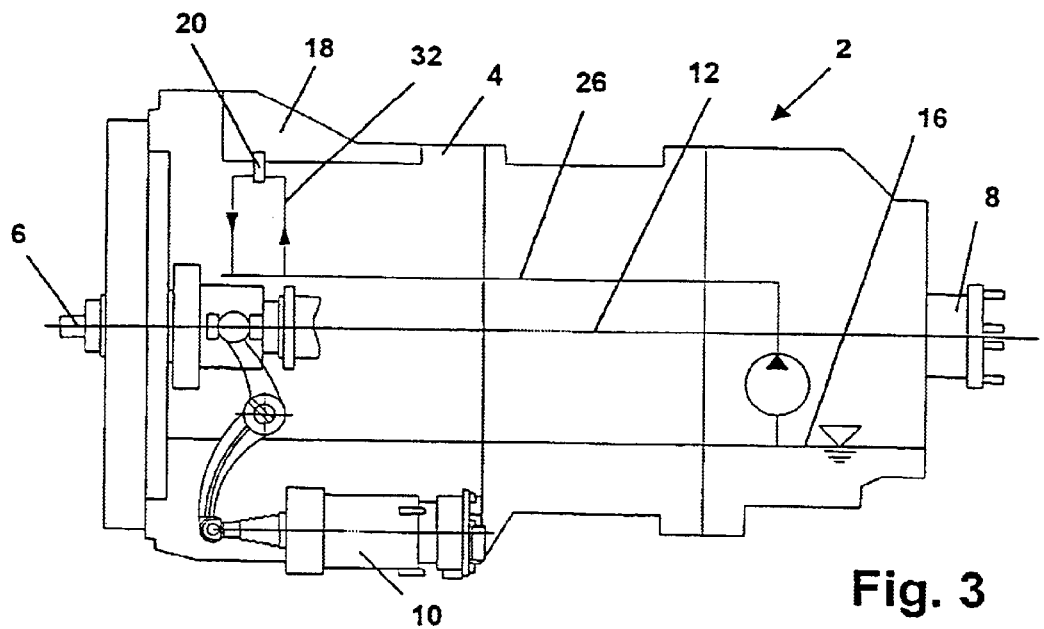
FIG. 3 is the temperature sensor in a pressurized oil line.

In FIG. 3, the same reference numerals have been used for the same components. From the pressurized oil line 26 branches off, a branch 32 in which is directly mounted the temperature sensor 20. The transmission oil directly flows through or around the temperature sensor 20.

Figure 4:
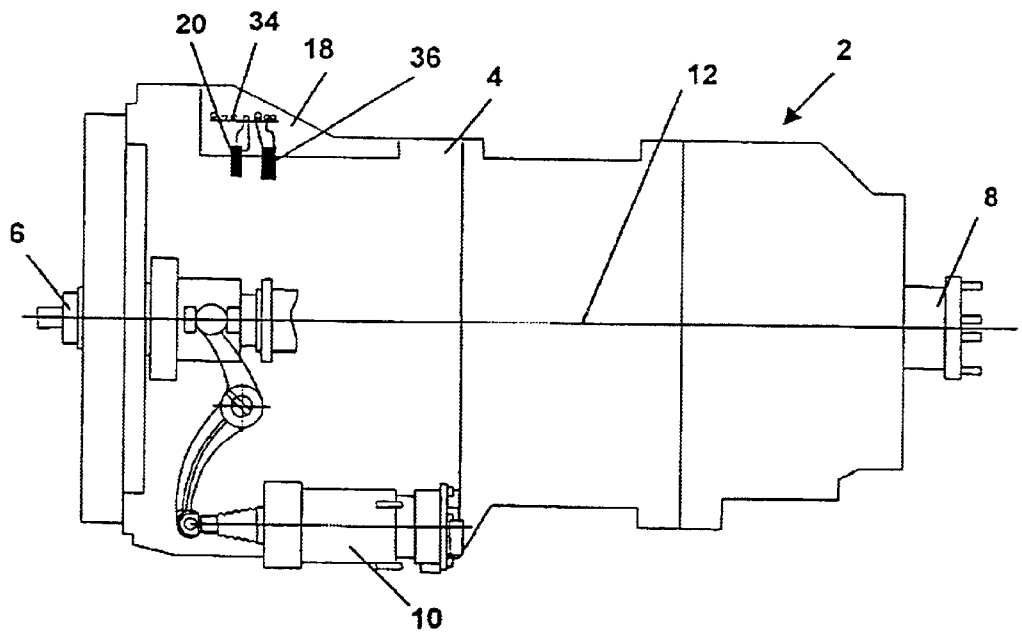
FIG. 4 is the direct tying of the temperature sensor to the transmission control electronics.

In FIG. 4, the same reference numerals have been used for the same components. Here a printed board 34 is diagrammatically shown within the controller 18. On the shortest line passage, the temperature sensor 20 is directly connected with the printed board without plug connections or is mounted upon the same. The temperature sensor 20 can also be replaced by a speed sensor 36 inserted in the same place or in the immediate proximity and its signals can be used for evaluation of the temperature in an electronic control, e.g., likewise upon the printed board 34 within the transmission controller 18. The speed sensor 36 can interact with a meter disk 38 (see FIG. 1) by the rotation of which transmission oil is propelled either upon the temperature sensor 20 or upon the speed sensor 36.

REFERENCE NUMERALS 2 transmission
4 transmission housing
6 input shaft
8 output shaft
10 clutch controller
12 main shaft
14 gear wheel
16 oil sump
18 transmission controller 20 temperature sensor
22 arrow
24 pump
26 pressurized oil line
28 opening
30 arrow
32 branch
34 printed board
36 speed sensor
38 meter disk

What is claimed is:

1. A device for measuring the temperature of a lubricating oil in a transmission (2), the device comprising:
   a transmission housing (4) having an oil sump for supplying the lubricating oil from the oil sump to a plurality of transmission components located within the transmission housing (4);
   an electronic transmission controller (18) situated in a portion of the transmission housing containing electronics for controlling a shifting actuation system of the transmission;
   a temperature sensor (20) arranged outside the oil sump (16); and
   wherein said temperature sensor (20) is situated in the portion of the transmission housing containing the electronic transmission controller and directly communicates with the electronics of the electronic transmission controller to permit direct evaluation of the lubricating oil temperature in the electronic transmission controller; and
   the device further comprises a pressurized lubricant circuit having an opening adjacent the temperature sensor (20) and, during operation of said transmission (2), the opening provides the temperature sensor with the lubricating oil by wetting the temperature sensor with an oil spray.

2. The device for measuring the temperature of a lubricating oil in the transmission (2) according to claim 1, the device further comprising a circuit board supporting the electronics for controlling a shifting actuation system of the transmission and wherein said temperature sensor (20) is directly integrated in the circuit board with the electronics.

3. The device for measuring the temperature of an oil in a transmission housing (4) according to claim 1, wherein said temperature sensor (20) is directly integrated with a speed sensor (36).

4. A device for measuring the temperature of a lubricating oil in a transmission (2), the device comprising:
   a transmission housing (4) having an oil sump for supplying the lubricating oil from the oil sump to a plurality of transmission components located within the transmission housing (4);
   an electronic transmission controller (18) situated in a portion of the transmission housing containing electronics for controlling a shifting actuation system of the transmission;
   a temperature sensor (20) arranged outside the oil sump (16); and
   wherein said temperature sensor (20) is situated in the portion of the transmission housing containing the electronic transmission controller and directly communicates with the electronics of the electronic transmission controller to permit direct evaluation of the lubricating oil temperature in the electronic transmission controller; and
   the device further comprises a pressurized lubricant circuit, wherein the temperature sensor (20) is situated in a branch (34) in the pressurized lubricant circuit (26) and is contacted by a flow of pressurized lubricating oil.

5. The device for measuring the temperature according to claim 4, wherein the device further comprises a circuit board supporting the electronics for controlling a shifting actuation system of the transmission, and the temperature sensor (20) is directly integrated in the circuit board with the electronics.

6. A device for measuring the temperature of a lubricating oil in a transmission (2), the device comprising:
   a transmission housing (4) having an oil sump for supplying the lubricating oil from the oil sump to a plurality of transmission components located within the transmission housing (4);
   an electronic transmission controller (18) having a circuit board supporting electronics controlling a shifting actuation system of the transmission, the electronic transmission controller (18) being situated in a portion of the transmission housing; and
   a temperature sensor (20) arranged outside the oil sump (16) and the temperature sensor (20), during operation of said transmission (2), is wetted by oil;
   wherein said temperature sensor (20) is a speed detector directly integrated in the circuit board with the electronics of the electronic transmission controller (18), the speed detector evaluates the temperature of the lubricating oil by a change of an internal resistance of the speed detector and directly communicates with the electronics of the electronic transmission controller to permit direct evaluation of the lubricating oil temperature in the electronic transmission controller (18).

* * * * *